US008527749B2

(12) United States Patent
Augenstein et al.

(10) Patent No.: US 8,527,749 B2
(45) Date of Patent: Sep. 3, 2013

(54) USER DEVICE, COMPUTER PROGRAM PRODUCT AND COMPUTER SYSTEM FOR SYSTEM FOR SECURE NETWORK STORAGE

(75) Inventors: Oliver Augenstein, Boeblingen (DE); Stefan Letz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/944,058

(22) Filed: Nov. 11, 2010

(65) Prior Publication Data

US 2011/0113234 A1   May 12, 2011

(30) Foreign Application Priority Data

Nov. 11, 2009   (DE) .................................... 09175641

(51) Int. Cl.
 *H04L 29/06*   (2006.01)
(52) U.S. Cl.
 USPC .......................................... 713/150; 713/189
(58) Field of Classification Search
 USPC .................................. 713/150, 189
 See application file for complete search history.

(56) References Cited

U.S. PATENT DOCUMENTS

| | | | | |
|---|---|---|---|---|
| 5,829,053 A * | 10/1998 | Smith et al. | .................... | 711/202 |
| 5,860,079 A * | 1/1999 | Smith et al. | .................... | 713/100 |
| 5,893,140 A * | 4/1999 | Vahalia et al. | ................ | 711/118 |
| 5,944,789 A * | 8/1999 | Tzelnic et al. | ................ | 709/214 |
| 5,948,062 A * | 9/1999 | Tzelnic et al. | ................ | 709/219 |
| 6,154,854 A * | 11/2000 | Stallmo | ........................ | 714/6.12 |
| 6,289,398 B1 * | 9/2001 | Stallmo et al. | .................... | 710/5 |
| 6,298,386 B1 * | 10/2001 | Vahalia et al. | ................ | 709/234 |
| 6,329,985 B1 * | 12/2001 | Tamer et al. | .................. | 715/853 |
| 6,385,706 B1 * | 5/2002 | Ofek et al. | .................... | 711/162 |
| 6,393,540 B1 * | 5/2002 | Blumenau et al. | ............ | 711/165 |
| 6,453,354 B1 * | 9/2002 | Jiang et al. | .................... | 709/229 |
| 6,701,456 B1 * | 3/2004 | Biessener | ........................ | 714/20 |
| 6,763,423 B2 * | 7/2004 | Stakutis et al. | .................... | 711/5 |
| 6,839,706 B2 * | 1/2005 | Spiers et al. | .................... | 709/217 |
| 6,883,063 B2 * | 4/2005 | Blumenau et al. | ............ | 711/113 |
| 7,103,641 B2 | 9/2006 | Brannock | | |
| 7,127,445 B2 * | 10/2006 | Mogi et al. | .......................... | 1/1 |
| 7,146,484 B2 * | 12/2006 | Taguchi | ........................ | 711/203 |
| 7,173,929 B1 * | 2/2007 | Testardi | ........................ | 370/355 |
| 7,263,108 B2 * | 8/2007 | Kizhepat | ........................ | 370/473 |
| 7,293,154 B1 * | 11/2007 | Karr et al. | .................... | 711/202 |
| 7,389,393 B1 * | 6/2008 | Karr et al. | .................... | 711/156 |
| 7,506,008 B2 * | 3/2009 | Yamamoto | ........................ | 1/1 |
| 7,516,296 B2 * | 4/2009 | Chang et al. | .................. | 711/202 |
| 7,610,348 B2 * | 10/2009 | Kisley et al. | .................. | 709/212 |
| 7,627,710 B1 * | 12/2009 | Todd et al. | ........................ | 711/1 |
| 7,702,850 B2 * | 4/2010 | Ludwig et al. | ................ | 711/114 |
| 7,797,393 B2 * | 9/2010 | Qiu et al. | ........................ | 709/213 |
| 7,873,619 B1 * | 1/2011 | Faibish et al. | ................. | 707/705 |

(Continued)

*Primary Examiner* — David García Cervetti
(74) *Attorney, Agent, or Firm* — Yee & Associates, P.C.; Jeffrey S. LaBaw (57) ABSTRACT

A technique for providing secure network storage by a user device that includes one or multiple network interfaces, a driver configuration component comprising a volume mapping schema and a connection mapping schema, and a driver operable to map I/O requests for logical data blocks to one or multiple network storage volumes as specified by the volume mapping schema, the data transfer between the user device and the one or multiple network storage volumes being mapped to one or multiple network connections as specified by the connection mapping schema, the driver thereby being operable to provide the user device with a logical storage volume.

18 Claims, 5 Drawing Sheets

(56) References Cited

U.S. PATENT DOCUMENTS

| | | | |
|---|---|---|---|
| 8,046,533 B2* | 10/2011 | Kompella et al. | 711/112 |
| 2002/0002661 A1* | 1/2002 | Blumenau et al. | 711/165 |
| 2002/0161983 A1* | 10/2002 | Milos et al. | 711/202 |
| 2002/0165941 A1* | 11/2002 | Gahan et al. | 709/219 |
| 2003/0105936 A1* | 6/2003 | Stakutis et al. | 711/202 |
| 2003/0140193 A1* | 7/2003 | Acharya et al. | 711/112 |
| 2003/0191745 A1* | 10/2003 | Jiang et al. | 707/2 |
| 2004/0098547 A1* | 5/2004 | Ofek et al. | 711/162 |
| 2004/0225719 A1* | 11/2004 | Kisley et al. | 709/212 |
| 2005/0044312 A1* | 2/2005 | Blumenau et al. | 711/113 |
| 2005/0216668 A1 | 9/2005 | Kobayashi et al. | |
| 2005/0289218 A1* | 12/2005 | Rothman et al. | 709/203 |
| 2006/0206662 A1* | 9/2006 | Ludwig et al. | 711/114 |
| 2006/0265525 A1* | 11/2006 | Boyd et al. | 710/39 |
| 2007/0016754 A1* | 1/2007 | Testardi | 711/206 |
| 2007/0038697 A1* | 2/2007 | Zimran et al. | 709/203 |
| 2007/0055703 A1* | 3/2007 | Zimran et al. | 707/200 |
| 2007/0088702 A1* | 4/2007 | Fridella et al. | 707/10 |
| 2009/0094380 A1* | 4/2009 | Qiu et al. | 709/239 |
| 2009/0158000 A1* | 6/2009 | Takahashi | 711/202 |
| 2009/0276593 A1* | 11/2009 | Jacobson et al. | 711/162 |
| 2009/0300023 A1* | 12/2009 | Vaghani | 707/10 |
| 2009/0300301 A1* | 12/2009 | Vaghani | 711/162 |
| 2009/0300302 A1* | 12/2009 | Vaghani | 711/162 |
| 2009/0327626 A1* | 12/2009 | Kaushik et al. | 711/162 |
| 2010/0094847 A1* | 4/2010 | Malan et al. | 707/705 |
| 2010/0095059 A1* | 4/2010 | Kisley et al. | 711/114 |
| 2010/0228903 A1* | 9/2010 | Chandrasekaran et al. | 711/6 |
| 2010/0232049 A1* | 9/2010 | Kompella et al. | 360/55 |
| 2011/0016272 A1* | 1/2011 | Jeong et al. | 711/114 |
| 2011/0060887 A1* | 3/2011 | Thatcher et al. | 711/171 |

* cited by examiner

USER DEVICE, COMPUTER PROGRAM PRODUCT AND COMPUTER SYSTEM FOR SYSTEM FOR SECURE NETWORK STORAGE

BACKGROUND

1. Field

The present invention relates to a user device, computer program product and computer system for providing secure access to a logical storage volume.

2. Description of the Related Art

Techniques for accessing and sharing remote storage devices offer a broad set of benefits for private persons as well as for the business world. Data stored solely on built-in hardware of end-user devices is prone to loss due to disc failure or incorrect use of application software. Methods for copying data to data repositories on physically remote machines are therefore commonly used to prevent a potentially catastrophic data loss. For enterprise environments, remote storage volumes are used for backup purposes but also as a repository for shared data and programs that can be accessed from different client machines in different locations. Several business companies have proceeded further in this direction and use diskless workstations instead of standard PCs or notebooks with inbuilt hard disks. Those diskless workstations receive data and software, including the operating system, via the network from a server, thereby significantly reducing maintenance efforts, e.g. in respect of licensing software or providing uniform system configurations to the client machines.

It is common practice for larger companies to store sensitive business data and programs on in-house data and application servers run by the company's own IT department. Many medium-sized businesses, however, cannot afford to run an IT department on their own and have to rely on external IT services, e.g. remote storage volume providers. Questions regarding the security of sensitive data immediately arise in this scenario, in particular in countries where industrial espionage is a common practice, if the company deals with medical or personal data or if a company has to fear unauthorized inspection of its internal data for any other reason.

SUMMARY

A user device adapted to provide secure network storage, comprising a driver being operable to provide the user device with a logical storage volume by mapping logical data blocks to data blocks on multiple network storage volumes and by mapping data blocks on the multiple network storage volumes to multiple network connections, thereby being operable to provide the user device with the logical storage volume, wherein the user device is operable to access the multiple network storage volumes via the multiple network connections.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

In the following, like-numbered elements in these figures are similar elements. Elements which have been discussed previously will not necessarily be discussed in later figures if the function is equivalent.

Figure 1:
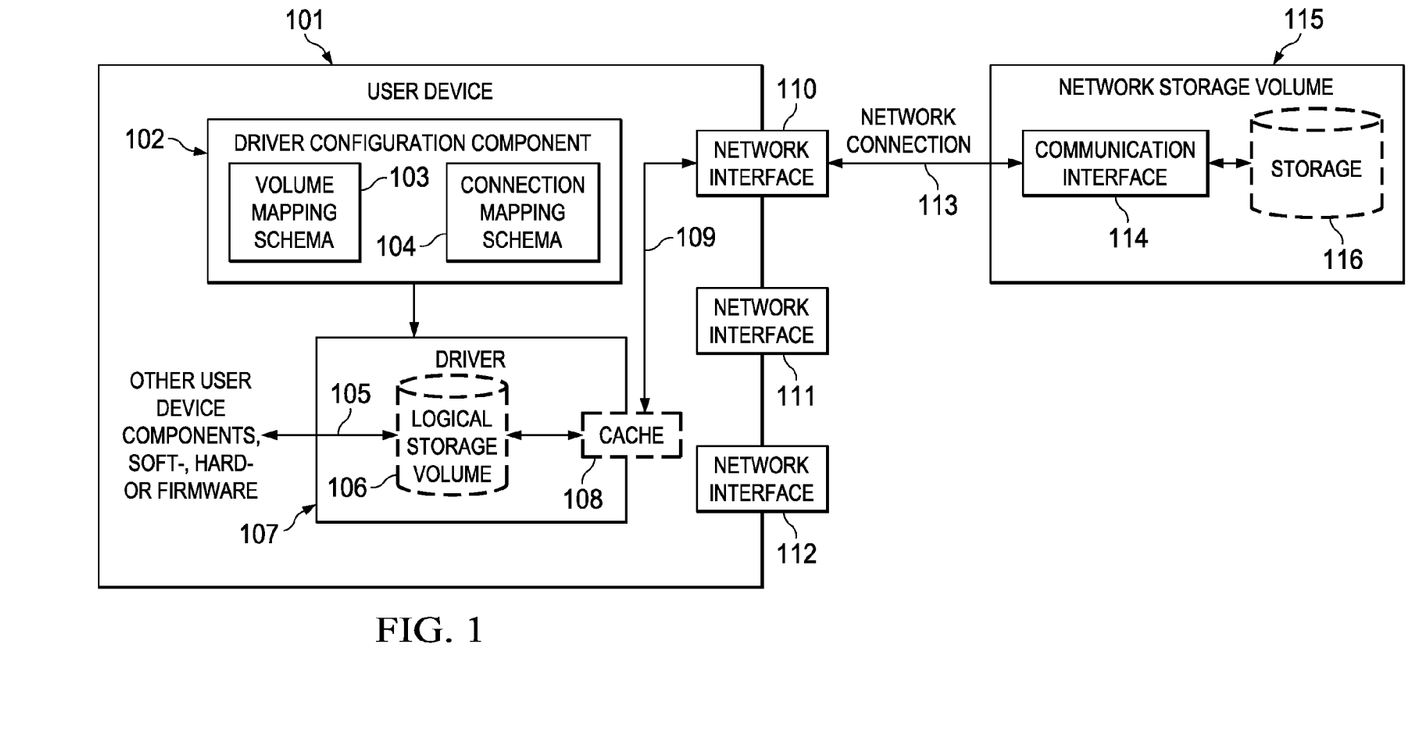
FIG. 1 is a block diagram showing the structure of one embodiment of the user device and of one network storage volume.

FIG. 1 shows one embodiment of the user device 101 and it's communication with one network storage volume 115 in detail. In one preferred embodiment, the user device is a processing device, e.g. a personal computer. In other embodiments of the invention, the user device is a network device, e.g. a network router or network switch. The user device 101 comprises a driver 107 and one or multiple physical or logical network interfaces 110, 111 and 112, e.g. an Ethernet card or WLAN adapter, and a driver configuration component 102.

The driver configuration component 102 comprises a volume mapping schema 103 and a connection mapping schema 104. The driver configuration component can be stored either on the user device 101 itself, or on a memory device connected to the user device, e.g. a USB memory stick. The driver configuration component can also be retrieved remotely, e.g. via a DHCP server. The volume mapping schema 103 and the connection mapping schema 104 specify the mapping between data blocks on the logical storage volume 106 and data blocks on network storage volume 115.

Figure 4:
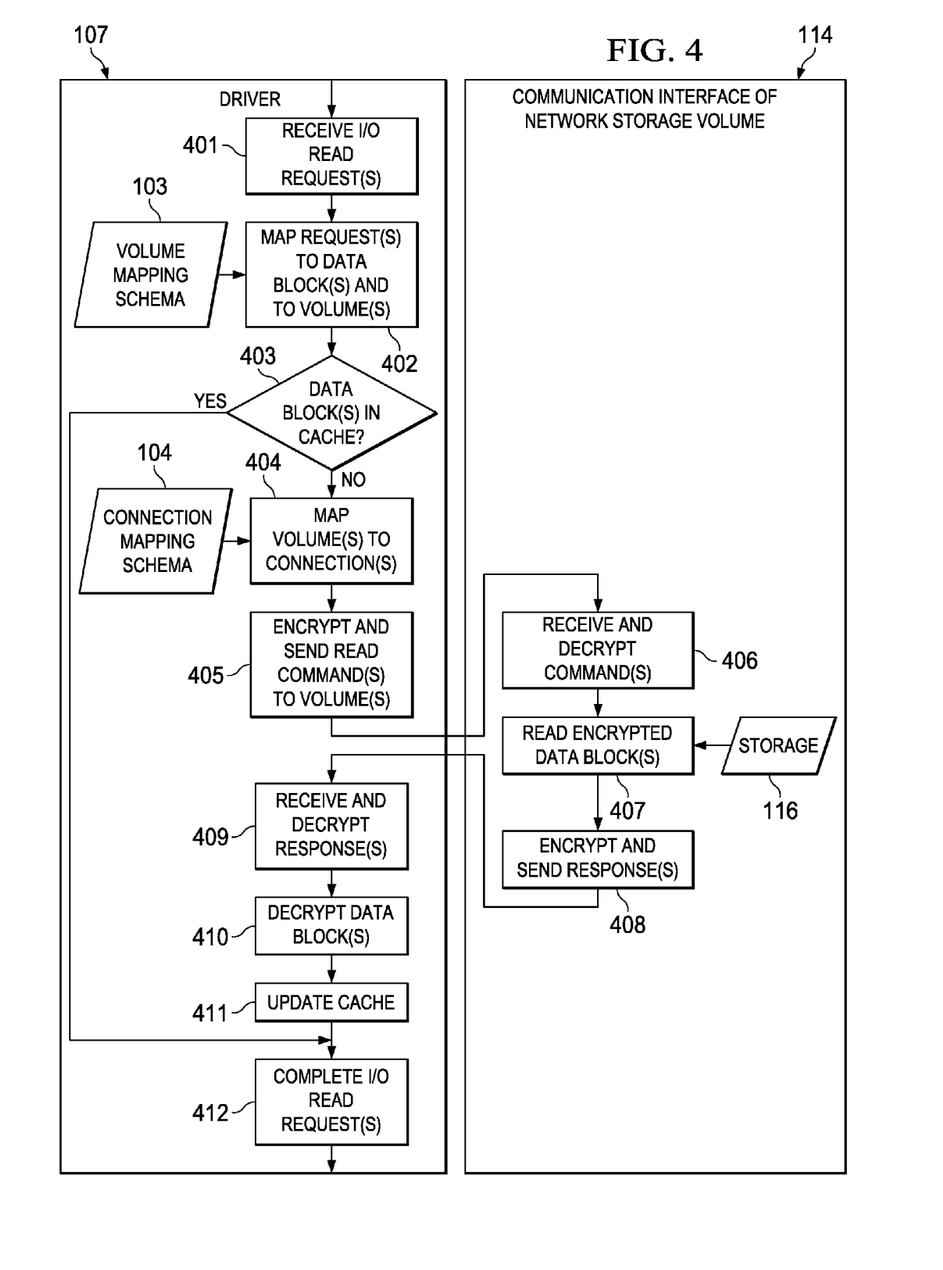
FIG. 4 is a flowchart showing the data flow between the user device and one network storage volume during a reading process.
Figure 5:
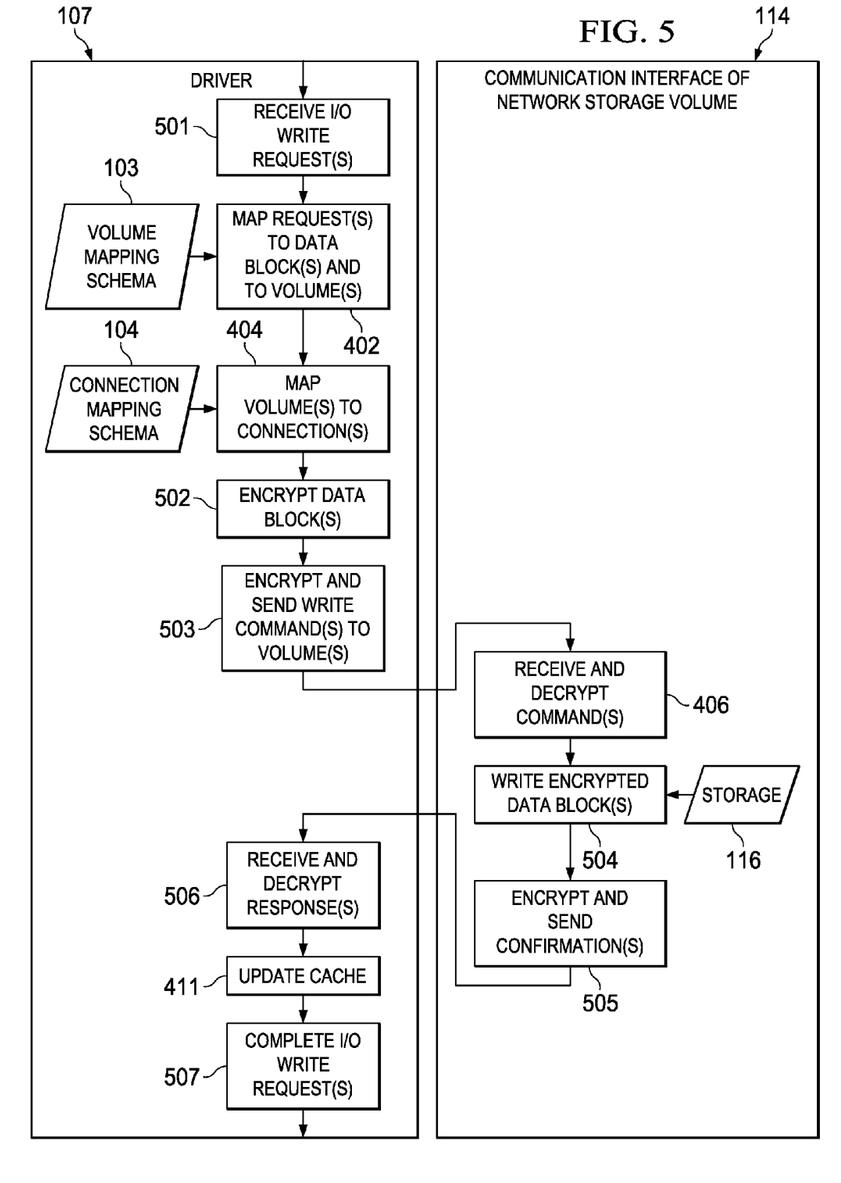
FIG. 5 is a flowchart showing the data flow between the user device and one network storage volume during a writing process.

The driver 107 can be a software program running on the user device, a hardware element attached to or integrated into the user device, or a combination of both, depending on the embodiment of the invention. In operation, the driver maps (at step 402 of FIG. 4) I/O requests for logical data block addresses to data blocks on one or multiple network storage volumes as specified in the volume mapping schema 103 in the driver configuration component. In step 404 (of FIG. 4), the driver maps the data blocks on the network storage volumes to be accessed for reading or writing to network connections as specified in the connection mapping schema 104. The successful execution of both mapping steps results in the emulation of a single logical storage volume 106 on the user device 101. The volume mapping step 402 and the connection mapping step 404 are depicted in FIGS. 4 and 5. The successful emulation of the logical storage volume 106 requires that the network storage volumes are accessible by the user device via one or multiple network connections. The logical storage volume 106 can transparently be accessed 105 by firmware, software programs running on the user device 101 (e.g. application software, the operating system (OS)), or other devices communicating with the user device (e.g. other personal computers, routers or switches).

Each network storage volume 115 is represented by a communication interface 114. To access a particular network storage volume, the driver 107 on the user device 101 initializes the communication with the corresponding communication interface (see also FIGS. 4 and 5). The communication interface 114 is a piece of software installed on each network storage volume. It handles the communication and accesses the data blocks on the corresponding storage 116 actually containing the data.

In a preferred embodiment of the invention, the storages of the network storage volumes are physical storages, e.g. hard disks, and the data blocks of the network storage volumes are physical data blocks. In other embodiments of the invention, the storages of the network storage volumes are logical storage volumes, each mapped to one or multiple physical storage volumes. In this case, an additional mapping layer is introduced between the logical storage volume 106 and the physical storage volumes actually containing the data. The functionality of the present invention is, however, not affected in any case in this scenario.

In other embodiments of the invention, the storages of the network storage volumes are data bases which the communication interface queries in order to read or write data blocks.

The user device 101 may comprise a cache 108 (e.g. based on solid-state drive technology) which stores data blocks sent to the network storage volumes and data blocks received from the network storage volumes. This improves the performance of the user device and reduces the communication between user device and network storage volumes, but the cache 108 may be absent in other embodiments of the invention.

The user device 101 may comprise one or multiple physical or logical network interfaces 110, 111 and 112 of various different types, e.g. an Ethernet card or a WLAN adapter.

Figure 2:
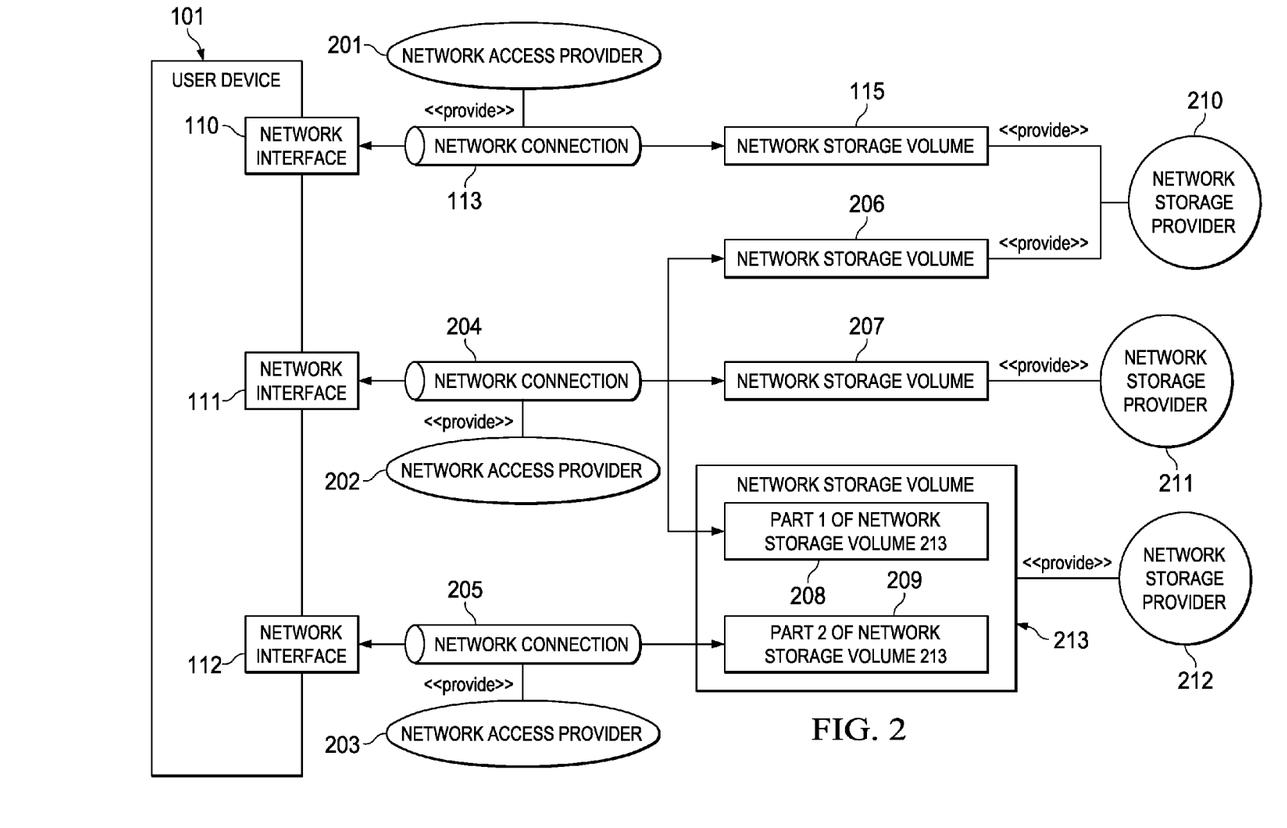
FIG. 2 is a block diagram illustrating one possible embodiment of the invention, a user device communicating with multiple network storage volumes via multiple network connections.

FIG. 2 shows one possible embodiment of the user device 101 comprising a logical storage volume 106 that is mapped via multiple network connections 113, 204 and 205 to data blocks on multiple network storage volumes 115, 206, 207, 213. The user device 101 comprising three network interfaces 110, 111, 112 is connected to the network storage volumes 115, 206, 207 and the two parts of network storage volume 213 via three network connections 113, 204 and 205. The network connections in the depicted embodiment are provided by different, independent network access providers 201, 202, 203. For example, 201 could be a network access provider for cell phones, 202 a DSL provider using telephone cable network and a WLAN Modem, and 203 another DSL provider, the network interface 110 could be cellular network adapter for computers, 111 could be a WLAN adapter and 112 an Ethernet card. Other network access technologies and corresponding network interfaces can be used likewise. The number and type of network interfaces comprised by the user device 101 can vary in different embodiments of the invention depending on the particular requirements of the user and the available network technology. The network storage volumes of the embodiment of the invention depicted in FIG. 2 are, with the exception of 115 and 206, provided by different independent (not owned by the same person or company) network storage providers. One network connection can be used by the user device 101 to access only a single network storage volume (e.g. network connection 113 for accessing network storage volume 115), but a connection can also be used to access multiple network storage volumes (e.g. network connection 204 for accessing network storage volumes 206 and 207 and for part 1 of network storage volume 213). The user device 101 can access whole network storage volumes, e.g. 206, or parts of network storage volumes, e.g. 208 or 209. In another embodiment of the invention, some of the network connections may also be provided by the same network access provider, e.g. a provider offering WLAN as well as cell phone Internet via satellite. The main purpose of FIG. 2 is to show that the depicted embodiment of the invention comprises a highly complex and flexible mapping of the data exchange between user device 101 and each particular network storage volume: network storage volumes can be accessed via one or multiple different network connections. The communication with network storage volume 213 can be accomplished via multiple connections (connection 204 and 205) while one connection (connection 204) may be used for the communication between user device and multiple network storage volumes (network storage volumes 206, 207 and a part of volume 213).

Since the data blocks are distributed among the network storage volumes as defined by the volume mapping, insight into the actual user data is only possible when all network storage volumes are accessible and the mapping is known. Using multiple network storage volumes provided by different independent network storage providers prevents a single network storage provider from knowing all network storage volumes and from being able to access the totality of the stored data. To further increase security of the user data, the data blocks can be encrypted using an encryption method with a key known only to the user or the user device 101. Encryption and decryption of data blocks take place on the user device side (see also FIGS. 4 and 5).

Figure 3:
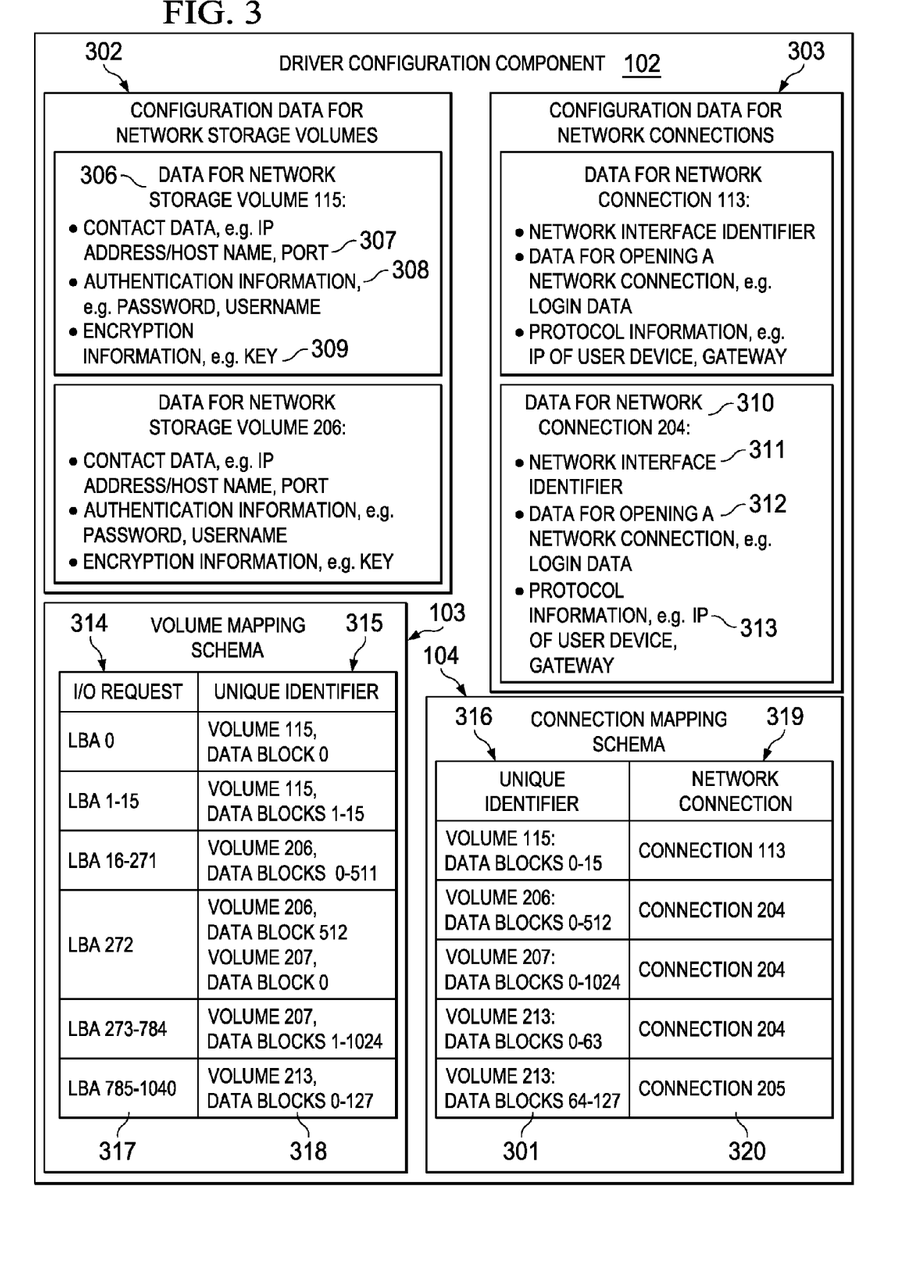
FIG. 3 is a block diagram of the driver configuration component.

Communication between the user device 101 and the network storage volumes takes place over at least one network connection, as defined by the connection mapping schema 104 in the driver configuration component 102. If multiple network connections are used, the connection mapping schema maps network storage volumes or parts of network storage volumes to network connections. Using multiple network connections provided by independent network access providers (owned by independent persons or companies) prevents a single network access provider and other parties that might eavesdrop on the communication from knowing which network storage volumes exist and from collecting meaningful data as no network access provider has access to the totality of data transferred. In preferred embodiments of the invention, the security of the communication is further increased by encrypting each network connection using an encryption method, e.g. TLS or SSL.

The driver 107 is operable to use techniques such as RAID 5 to distribute the data blocks and the corresponding parity information between the network storage volumes. The parity information allows the reconstruction of missing data blocks after failure of one of the network storage volumes. Other RAID levels can also be used, e.g. for mirroring the data. Provided an appropriate RAID level has been chosen, it is even possible to add additional network storage to the system "on the fly" without having to resize existing partitions or to reinstall an OS installed on the logical storage volume 106. An additional benefit of this scenario is the possibility for an implicit data backup: in case e.g. RAID 5 has been used for distributing user data as well as parity information over multiple network storage volumes, the data can be reconstructed from the parity information in case of a failure of one of these network storage volumes. In case one network storage provider does not backup the data located on his storage volumes on a regular basis, this implicit backup ensures that the data is still backed-up.

In other embodiments of the present invention, the number of used network storage volumes and network connections as well as the mapping between the connections and the volumes may differ from the depicted scenario, including the possibility of the network device being connected to only one singular network storage device via one single network connection.

In some preferred embodiments of the invention, the user device 101 is a data processing device, e.g. a computer. In other embodiments of the invention, the user device 101 is a network device, e.g. a network router or a network switch.

FIG. 3 shows the configuration data 302, 303 and mapping schemas 103, 104 required for the complex mapping of data blocks of the logical storage volume 106 to data blocks located on one or multiple network storage volumes, and for mapping the communication between a user device 101 and multiple network storage volumes on one or multiple network connections.

For each network storage volume, information for identifying the network storage volume and for communicating with the network storage volume, e.g. 307, for authentication, e.g. 308, and for encrypting the data exchange with this volume, e.g. 309, are stored in 302 of the driver configuration component 102.

The driver configuration component stores all contact information required to access the network storage volumes that shall be used by the driver 107 for the emulation of the logical storage volume. This information depends on the protocol used by the user device 101 to communicate with the network storage volumes. In a preferred embodiment, the user device 101 is connected to the Internet and uses TCP/IP or UDP/IP protocols for communication with the network storage volumes. In this case, for each network storage volume, the IP address of the host machine comprising the network storage volume, either in IPv4 or IPv6 format, and the port number on which the network storage volume listens are required. In place of the IP address, the name of the host, e.g. www.ibm.com, can be used, which can be resolved via DNS.

Which kind of information is required for communication with each network storage volume also depends on whether the driver 107 is a piece of software run by an OS or whether the driver is a firmware or hardware component of the user device. In case the driver is implemented as software, the driver is adapted to use communication functionality provided by the OS. In case the driver is implemented as firmware or hardware and cannot make use of an OS for exchanging data with the network storage volumes, additional information may be required for enabling low-level communication (see layers according to the OSI model). This information is in this case also stored in 303.

The driver configuration component 102 also comprises authentication information 308 for each network storage volume, e.g. username and password required to access the network storage volume. A multitude of different authentication strategies can be used, e.g. a simple password which has to be stored on the network storage volume in hash form. This password is, however, at risk to be misused by the network storage provider. Therefore, also authentication methods providing a higher level of security are supported, e.g. various complex challenge-response methods. Complex authentication methods are, due to their time requirements, usually not applied on a transaction basis but rather on a session basis or for a predefined period of time. In a preferred embodiment of the invention, the authentication method applied supports the mutual authentication of both parties, the user device 101 and the network storage volume.

In case the data transfer between user device 101 and network storage volume is to be encrypted, multiple encryption methods are supported, comprising symmetric encryption strategies as well as asymmetric, public key—private key encryption schemas. Data required by the respective encryption method, e.g. the key(s) used, is also stored in the driver configuration component, e.g. 309. If an asymmetric encryption method is applied, the driver encrypts its communication directed to a network storage volume with his private encryption key. The network storage volume decrypts the data received from the user device 101 via a decryption key. The data received by the driver 107 from the network storage volume can be decrypted by the driver via a private decryption key capable of decrypting data encrypted by the encryption key of the network storage volume. In this scenario, the driver configuration component 102 contains two keys per network storage volume: one for encrypting data sent to the network storage volume and one key for decrypting data received from the network storage volume. The network storage volume receives its key(s) e.g. during the initial configuration of the driver.

For each network connection, information for establishing or using the existing network connection is stored in the driver configuration component 102. For example, the data 310 for network connection 204 comprises information 311 to identify the network interface used for communication, login information 312, and protocol information 313. For each network connection, the network interface that is to be used has to be specified in the driver configuration component 102 and has to be provided by the user during an initial configuration step.

The driver configuration component 102 may also comprise information required to establish a network connection, for example, user name and password provided by the network access provider, e.g. login data for cellular mobile Internet or for a WLAN network. In case the utilized network interface(s) are Ethernet card(s) establishing a permanent connection to the Internet, these login details might not be required. In case the driver 107 is a software component capable to access and use information on available Internet connections already known to the OS, the entry of the login information for the network connection may be also optional, because the driver 107 is in this case able to retrieve the required information from the OS. In case the driver is a firmware or hardware component or is for other reasons not able to access the network information already known to the OS, the login details for each network connection in the driver configuration component 102 are required.

The driver configuration component 102 also comprises protocol information for each network connection. One preferred embodiment of the invention uses the TCP/IP protocol for data exchange via the network. In this case, the required protocol information comprises the IP address of the user device (which can be a fixed IP number or can be automatically retrieved from the network access provider of a connection) and may also comprise information on the used subnet mask and preferred gateway or DNS servers. Usually, the protocol information for each network connection is already known to the OS and does not have to be entered in the driver configuration component 102 a second time, as the driver 107 can access the required information stored already by the OS. In this case, the information, which network interface is to be used for which network connection, is sufficient and the login and protocol information is retrieved from the OS. In case the login and protocol information is not available to the driver, e.g. because the driver is a firmware or hardware component of the user device, the required information has to be provided by the user in an initial configuration step.

The mapping of data blocks of the logical storage volume 106 of the user device to data blocks on one or multiple network storage volumes and the mapping of the data exchange between the user device 101 and these volumes to one or multiple network connections provides a secure way of storing and sharing sensitive data. The distribution of data on multiple network storage volumes and the distribution of data exchange on multiple connections ensure that no single network storage provider or network access provider can get insight on the totality of the data or the data communication. The volume mapping and connection mapping steps executed by the driver allow a highly complex and flexible mapping of multiple network connections and network storage volumes as depicted in FIG. 2. The information, which data blocks on a network storage volume correspond to a data block on the logical storage volume 106 of the user device and which connection is to be used for data transfer with each network storage volume, is specified in the volume mapping schema 103 and the connection mapping schema 104 of the driver configuration component 102. In FIG. 3, element 316 refers to unique identifier entries within the connection mapping schema, the identifiers referencing data block(s) or data block ranges on a network storage volume. The unique identifiers 316 are mapped to network connections 319. I/O requests for particular LBAs or LBA ranges 314 on the logical storage volume 106 are mapped to unique identifier entries 315 within the volume mapping schema referencing data block(s) or data block ranges on network storage volumes. The mapping is a two-step process, beginning with a volume mapping step (see 402 in FIGS. 4 and 5) as specified in the volume mapping schema 103 and a connection mapping step (see 404 in FIGS. 4 and 5) as specified by the connection mapping schema 104 in the driver configuration component.

FIGS. 4 and 5 depict an I/O request 401/501, e.g. by the OS, for data blocks on the logical storage volume. The structure of the I/O request may vary depending on whether the driver 107 was implemented as software running in an OS environment or as a firmware or hardware component of the user device 101. For example, the I/O request may use the CHS (cylinder-head-sector) or LBA (logical block addressing) approaches to specify the requested data blocks. In the following, the description will refer to an embodiment of the invention using LBA addressing.

Volume mapping: The I/O request for one or multiple logical block addresses of the logical storage volume 106 is mapped by the driver to data block(s) on one or multiple network storage volumes as specified by the volume mapping schema 103. This schema assigns each LBA of the logical storage volume, e.g. 317, to one or multiple unique identifiers 315 for data blocks located on a network storage volume, e.g. 318. The term LBA in FIG. 3 stands for "logical block address" of the logical storage volume. This unique identifier consists of a combination of the storage volume number and the data block number. The unique identifier for data block 4 on network storage volume 206 would therefore consist of a unique combination of the volume identifier "206" and the data block identifier "4". The size of a logical or physical data block may be one byte or multiple bytes. As the size of the logical data blocks may differ from the size of the physical data blocks on the network storage volumes, the mapping does not necessarily imply a 1:1 mapping of blocks. As depicted in FIG. 3, column 314, LBA 272 is mapped to data block 512 on network storage volume 206 and data block 0 on network storage volume 207. As FIG. 3 shows, in addition to mapping single LBAs to single unique identifiers of data blocks on network storage volumes, LBA ranges can be mapped to data blocks or data block ranges on the network storage volumes. The mapping depicts the possible complexity of the mapping between data blocks of the logical storage volumes and the different physical storage volumes. Even in case only one network storage volume provided by only one network storage provider is available, the storage strategy via this complex mapping of data blocks on the user device side makes it difficult for the network storage provider to get access to and interpret the data stored on this single volume as the data blocks are not necessarily stored in consecutive order and can only be reconstructed if the mapping schema, which is located on the user device side, is known.

An additional benefit of the described mapping approach is its applicability for storage virtualization. Additional network storage volumes can be added to the system simply by adding the login, authentication and encryption parameters required for the additional network storage volume and by adding the additional data blocks to the volume and connection mapping schemas. The size of the logical storage volume 106 can thereby seamlessly be increased without affecting the data already stored on the existing network storage volumes.

The driver 107 does not know and does not need to know how the data is organized on the network storage volumes. The mapping is based on data blocks, not files or file trees. The driver 107 provides other software, firmware or hardware components with an emulated logical storage volume based on the mapping of data blocks of this logical volume to one or multiple network storage volumes. For example, this logical volume can be formatted in various file system formats and used to store data or to install and run an OS.

The data on the network storage volumes can be organized in multiple forms, e.g. in the form of a file system or also as a data base. The data organization form may vary among the used network storage volumes. The only general requirement is that each network storage volume comprises a communication interface 114 for communicating with the driver 107 on the user device.

Connection mapping: The I/O request for LBA data blocks 785-1040 results in the driver 107 returning the unique identifiers for data blocks 0-127 on network storage volume 213 as specified in the volume mapping schema. In the connection mapping step, the list of unique identifiers for data blocks 0-127 on network storage volume 213 are mapped to network connections that shall be used for the data exchange. In the example depicted in FIG. 3, data blocks 0-63 on network storage volume 213 are mapped to network connection 204, while data blocks 64-127 on network storage volume 213 are mapped to network connection 205. This means that for transferring the first part of the data blocks (0-63), connection 204 and its corresponding network interface are used, while for the transfer of the second part of the data blocks (64-127), connection 205 and its corresponding network interface are used.

Creation of the Mapping Schemas:

During an initial configuration step, the driver receives the required configuration and mapping schemas from the user (or by the user and the OS) and stores this configuration data in the driver configuration component 102, e.g. on a removable memory device like a USB memory stick or a hard disk. In case the OS can provide the driver with information on existing network connections, the user does not have to specify the connection parameters again. The user has to decide which portion of the logical storage volume 106 shall be mapped to which data blocks or data block ranges of the available network storage volumes, and which connections shall be used to handle I/O requests regarding particular data blocks on a particular network storage volume.

In one further embodiment of the invention, the connection mapping schema 104 comprises a mapping of network storage data blocks not to a single network connection but rather to a prioritized list of network connections. In case the network connection first in that list is not available, an alternative network connection next in that list can be used for communication.

FIG. 4 is a flowchart showing the data flow between user device and one network storage volume in the reading process.

In order to read one or more data blocks from the network storage volume 115, the driver sends one or more read commands to the communication interface 114. Each read command contains the unique identifiers of one or multiple data blocks. The communication interface 114 then reads the corresponding data blocks from the storage and sends them back to the driver in one or multiple responses. In further embodiments of the invention, data blocks may in addition be encrypted (FIG. 5, 502) and decrypted (FIG. 4, 410), or a cache 108 may be used to reduce the amount of data exchanged between the user device and the network storage volumes. Only data blocks not contained in the cache are in this case requested from the network storage volume. In case the user device 101 comprises a cache 108, the cache is updated 411 after receiving and decrypting the response(s) 409. The details of the volume and connection mapping steps are explained in the description of FIG. 3. In some embodiments of the invention, the steps 405, 406, 408 and 409 are executed without encrypting and decrypting command(s) and response(s).

FIG. 5 is a flowchart showing the data flow between user device 101 and network storage volume in the writing process. In order to write one or more data blocks to the network storage volume, the driver sends one or more write commands to the communication interface 114. Each write command contains one or multiple data blocks and their unique identifiers. The communication interface then updates the storage 116 of the network storage volume and sends one or more confirmations back to the driver. In further embodiments of the invention, data blocks may in addition be encrypted (FIG. 5, 502) and decrypted (FIG. 4, 410), or a cache 108 may be used to reduce the amount of data exchanged between the user device and the network storage volumes. In case the user device comprises a cache 108, the cache is updated after receiving and decrypting the confirmation(s). The details of the volume and connection mapping steps are explained in detail in the description of FIG. 3.

In some embodiments of the invention, the steps 503, 406, 505 and 506 are executed without encrypting and decrypting command(s) and confirmation(s).

In preferred embodiments of the invention, the network connections are connections to the Internet (e.g. DSL and cable broadband connections) and the network access providers are Internet service providers.

In further preferred embodiments of the invention, the network connections are different connections within the same LAN and the network access providers are the people responsible for providing and maintaining the LAN.

In further preferred embodiments of the invention, the network storage providers are enterprises offering some form of storage capacity, optionally along with compute capacity, through the Internet. If a network storage provider does not directly offer the communication interface 114 but provides compute capacity, the communication interface can be installed and then executed using this compute capacity.

In further embodiments of the invention, network storage volumes are provided by other computing devices or networking devices in the same network as the user device 101 (e.g. personal computers in the same LAN).

In a further preferred embodiment of the invention, the user device 101 is a personal computer without a built-in hard disk drive. The driver is integrated into the BIOS of the personal computer. When the personal computer is booted for the first time, the driver guides the user through the initial configuration, which consists of specifying and activating network connections and network storage volumes. After this initial configuration, the BIOS presents a logical storage volume 106 to the user as a hard disk drive on which the user can install and run an OS. This embodiment of the present invention enables the user device to load the OS and other required pieces of data and software from the remote storage thereby combining the operational benefits of a diskless workstation environment with a highly secure method of data transfer and storage.

Further embodiments of the invention comprise user devices that have, but do not use, their built-in hard drive and load the OS and other required pieces of data and software from the remote storage.

In these "diskless" and in other embodiments of the invention, the driver configuration component 102, which specifies the mapping schemas, the network connections and the access to the network storage volumes, can be stored either on the user device (e.g. protected by a power-on password) or on a memory device that the user connects to the user device before power-on (e.g. a smart card or a USB memory stick). The latter allows the user to initialize another user device of the same kind simply by connecting the memory device before power-on. The invention according to this embodiment is therefore also a solution to the problem of how a user profile and user-specific data can be portably provided to users using multiple different computer devices, e.g. a business desktop and a business notebook in addition to a notebook used for business as well as private purposes.

In further preferred embodiments of the invention, the user device 101 is a personal computer with an OS stored on a built-in hard disk drive. The user installs the driver 107 in the form of a software package and then configures the driver to activate and use certain network connections and certain network storage volumes. After this initial configuration, the driver presents a logical storage volume 106 to the OS and to the user as another hard disk drive. On this hard disk drive, the user can store sensitive data as well as data that is to be accessed from drivers running on other personal computers with the same configuration.

In further preferred embodiments of the invention, the user device 101 is a network switch that is part of a LAN. The driver 107 is integrated into the network switch's firmware and allows other computing devices and network devices connected to the LAN to access its logical storage volume 106 through a network protocol such as SMB. On the logical storage volume, the users can backup sensitive data or store shared data.

Preferred embodiments of the invention provide an integrated, transparent, flexible and secure way of storing user data on remote, distributed storage. The distributed, remote storage is transparently presented to the user, to software programs, e.g. application software or the OS, and to hardware components of the user device 101 in the form of a single logical volume.

ABBREVIATIONS

BIOS Basic Input/Output System
DHCP Dynamic Host Configuration Protocol
DNS Domain Name System
DSL Digital Subscriber Line
IP Internet Protocol
IPv4/6 Internet Protocol version 4/6
LAN Local Area Network
OS Operating System
OSI Open Systems Interconnection
RAID Redundant Array of Independent Disks
SMB Server Message Block
SSL Secure Sockets Layer
TCP Transmission Control Protocol
TLS Transport Layer Security UDP User Datagram Protocol
USB Universal Serial Bus
WLAN Wireless Local Area Network

What is claimed is:

1. A user device adapted to provide secure network storage, comprising:
   a driver being operable to provide the user device with a logical storage volume by mapping logical data blocks to data blocks on multiple network storage volumes and by mapping data blocks on the multiple network storage volumes to multiple network connections, thereby being operable to provide the user device with the logical storage volume; and
   a driver configuration component comprising a volume mapping schema and a connection mapping schema, wherein the mapping of the logical data blocks to the data blocks on the multiple network storage volumes is performed as specified by the volume mapping schema;
   wherein the user device is operable to access the multiple network storage volumes via the multiple network connections.

2. The user device according to claim 1 wherein the volume mapping schema is adapted to support the mapping of data blocks of the logical storage volume to the data blocks of the multiple network storage volumes, the network storage volumes being provided by independent network storage providers, each network storage volume of the multiple network storage volumes containing a communication interface for communicating with the driver of the user device, and wherein I/O requests for one or multiple data blocks on the logical storage volume are mapped to one or multiple unique identifiers according to the volume mapping schema, with each unique identifier identifying a data block on one network storage volume.

3. The user device according to claim 2, wherein the connection mapping schema is adapted to support the mapping of the data blocks of the multiple network storage volumes to the multiple network connections, the multiple network connections being provided by independent network access providers, and wherein unique identifiers for one or multiple data blocks on a particular network storage volume are mapped to a given network connection according to the connection mapping schema.

4. The user device according to claim 1, wherein the driver is operable to encrypt the communication of the user device with the multiple network storage volumes for each network connection individually.

5. The user device according to claim 1, wherein the driver is operable to encrypt the data stored on the multiple network storage volumes for each network storage volume individually.

6. The user device according to claim 1, wherein the driver is located on a hardware component attached to the user device.

7. The user device according to claim 1, wherein the driver configuration component is stored on a locally maintained removable medium or is retrieved remotely.

8. The user device according to claim 1 being a computing device or a network device.

9. The user device according to claim 1 wherein the user device is a computer and the driver is integrated into the BIOS of said computer, the BIOS being operable to present a logical storage volume to the user as a hard disk drive on which an operating system can be installed and run.

10. A method adapted to provide secure network storage to a user device, comprising the steps of:
   mapping I/O requests for data blocks on a logical storage volume to data blocks on multiple network storage volumes as specified by a volume mapping schema, the mapping being executed by a driver;
   mapping data blocks of the multiple network storage volumes to multiple network connections as specified by a connection mapping schema, the mapping being executed by the driver;
   sending read/write commands from the driver of the user device to the multiple network storage volumes, the read/write commands being sent via the multiple network connections;
   receiving the read/write commands by a plurality of communication interfaces, with each communication interface of the plurality of communication interfaces being installed on a given network storage volume of the plurality of network storage volumes; and
   executing the received read/write commands by the plurality of communication interfaces.

11. The method according to claim 10 further comprising the steps of:
   sending responses resulting from the executing of the received read/write commands by the plurality of communication interfaces to the driver;
   receiving the responses by the driver; and
   completing the read/write commands at the user device using the received responses.

12. The method according to claim 10, wherein the volume mapping schema is adapted to support a mapping of data blocks of the logical storage volume to the data blocks of the multiple network storage volumes, the multiple network storage volumes being provided by a plurality of different independent network storage providers.

13. The method according to claim 12, wherein the connection mapping schema is adapted to support a mapping of the data blocks of the multiple network storage volumes to the multiple network connections, the multiple network connections being provided by a plurality of different independent network access providers.

14. A computer program product comprising a non-transitory computer readable storage device having programming code stored thereon that is operable to perform the method according to claim 10.

15. A computer system adapted to provide secure network storage to a user device, comprising:
   multiple network connections;
   multiple network storage volumes;
   a driver configuration component, the driver configuration component comprising a volume mapping schema and a connection mapping schema; and
   the user device comprising multiple network interfaces and a driver, the user device being operable to connect to the multiple network connections and being operable to access the multiple network storage volumes, and the driver being operable to provide the user device with a logical storage volume using the multiple network connections and the multiple network storage volumes, wherein each network storage volume of the multiple network storage volumes comprises a communication interface for communication with the driver of the user device.

16. The computer system of claim 15, wherein the volume mapping schema is adapted to support a mapping of data blocks of the logical storage volume to data blocks of multiple network storage volumes, the network storage volumes being provided by independent network storage providers, and wherein I/O requests for one or multiple data blocks on the logical storage volume are mapped to one or multiple unique identifiers according to the volume mapping schema, each unique identifier identifying a data block on one network storage volume.

17. The computer system of claim 16, wherein the connection mapping schema is adapted to support a mapping of the data blocks of multiple network storage volumes to the multiple network connections, the multiple network connections being provided by independent network access providers.

18. The computer system of claim 17, wherein unique identifiers for one or multiple data blocks on a particular network storage volume are mapped to a network connection according to the connection mapping schema, and wherein the driver is operable to emulate the logical storage volume by applying a volume mapping step as specified in the volume mapping schema and a connection mapping step as specified in the connection mapping schema.

* * * * *